(12) United States Patent
Ikeda

(10) Patent No.: US 11,420,267 B2
(45) Date of Patent: Aug. 23, 2022

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Yoshihito Ikeda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 155 days.

(21) Appl. No.: 16/634,576

(22) PCT Filed: Jul. 24, 2018

(86) PCT No.: PCT/JP2018/027733
§ 371 (c)(1),
(2) Date: Jan. 28, 2020

(87) PCT Pub. No.: WO2019/026697
PCT Pub. Date: Feb. 7, 2019

(65) Prior Publication Data
US 2020/0269326 A1   Aug. 27, 2020

(30) Foreign Application Priority Data

Aug. 2, 2017 (JP) .............................. JP2017-149840
Aug. 30, 2017 (JP) .............................. JP2017-164974

(51) Int. Cl.
*B23B 27/14* (2006.01)
*B23B 27/16* (2006.01)

(52) U.S. Cl.
CPC ........ *B23B 27/145* (2013.01); *B23B 27/1603* (2013.01); *B23B 2200/083* (2013.01); *B23B 2200/201* (2013.01); *B23B 2200/3672* (2013.01)

(58) Field of Classification Search
CPC .............. B23B 27/145; B23B 27/1603; B23B 2200/3672; B23B 2200/201; B23B 2200/083
See application file for complete search history.

(56) References Cited

U.S. PATENT DOCUMENTS

| | | |
|---|---|---|
| 3,786,541 A | 1/1974 | Lundgren |
| 4,318,645 A | 3/1982 | McCreery |

(Continued)

FOREIGN PATENT DOCUMENTS

| | | |
|---|---|---|
| DE | 4314570 A1 | 11/1994 |
| DE | 19856931 A1 | 6/2000 |

(Continued)

*Primary Examiner* — Alan Snyder
(74) *Attorney, Agent, or Firm* — Viering Jentschura & Partner MBB

(57) ABSTRACT

A cutting insert may include a first surface, a second surface, a third surface, and a land surface. The first surface may include a first corner, a first side, and a second side. The land surface may be inclined relative to the first surface and the third surface. The land surface may include a first land surface connecting to the first corner. An imaginary flat surface orthogonal to a central axis connecting a center of the first surface and a center of the second surface may be a reference plane, a first inclination angle of a part of the first land surface which connects to a midportion of the first corner may be larger than a second inclination angle of a part of the first land surface which connects to an end portion at a side of the first side of the first corner.

7 Claims, 22 Drawing Sheets

(56) References Cited

U.S. PATENT DOCUMENTS

| | | |
|---|---|---|
| 4,340,324 A | 7/1982 | McCreery |
| 5,771,763 A | 6/1998 | Jonas et al. |
| 6,786,682 B1 | 9/2004 | Wiman |
| 10,040,125 B2 | 8/2018 | Matsuda et al. |
| 11,077,502 B2 | 8/2021 | Sakai |
| 2002/0127068 A1 | 9/2002 | Kinukawa et al. |
| 2006/0188347 A1 | 8/2006 | Kratz |
| 2006/0228179 A1 | 10/2006 | Alm et al. |
| 2008/0292415 A1 | 11/2008 | Kuroda et al. |
| 2012/0170987 A1 | 7/2012 | Komatsuka |
| 2013/0064613 A1 | 3/2013 | Krishtul |
| 2013/0236257 A1 | 9/2013 | Nada et al. |
| 2015/0078844 A1 | 3/2015 | Majima et al. |
| 2015/0283617 A1 | 10/2015 | Nagarajan et al. |
| 2015/0375303 A1 | 12/2015 | Fujii |
| 2016/0297010 A1 | 10/2016 | Kukino et al. |
| 2017/0320143 A1 | 11/2017 | Lof |
| 2018/0161886 A1 | 6/2018 | Hasegawa |

FOREIGN PATENT DOCUMENTS

| | | | |
|---|---|---|---|
| JP | S61159341 A | 7/1986 | |
| JP | S61219503 A | 9/1986 | |
| JP | H02139003 U | 11/1990 | |
| JP | H02139004 U | 11/1990 | |
| JP | 2002046002 A | 2/2002 | |
| WO | WO-2006091141 A1 * | 8/2006 | ........... B23B 27/145 |
| WO | 2012023325 A1 | 2/2012 | |
| WO | 2016043127 A1 | 3/2016 | |
| WO | 2016189935 A1 | 12/2016 | |

\* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/027733 filed on Jul. 24, 2018, which claims priority to Japanese Application No. 2017-149840 filed on Aug. 2, 2017, and Japanese Application No. 2017-164974 filed on Aug. 30, 2017, which are entirely incorporated herein by reference.

TECHNICAL FIELD

The present disclosure generally relates to cutting inserts for use in a cutting process. More specifically, the present disclosure relates to cutting tools composed of a material whose hardness is relatively high, such as PCD and cBN.

BACKGROUND

As a cutting tool used in a cutting process of a workpiece such as metal, for example, a cutting insert is discussed in WO 2016/043127 (Patent Document 1). Patent Document 1 discusses the cutting insert may include negative lands of unequal width disposed between a rake surface on an upper surface and a flank surface on a side surface.

SUMMARY

A cutting insert in a non-limiting embodiment may include a first surface having a polygonal shape, a second surface located on a side opposite to the first surface, a third surface located between the first surface and the second surface, and a land surface located between the first surface and the third surface and inclined relative to the first surface and the third surface. The first surface may include a first corner, and a first side and a second side, each extended from the first corner. The land surface may include a first land surface connecting to the first corner.

An imaginary flat surface orthogonal to a central axis connecting a center of the first surface and a center of the second surface may be a reference plane, a first inclination angle of a part of the first land surface which connects to a midportion of the first corner with respect to the reference plane may be larger than a second inclination angle of a part of the first land surface which connects to an end portion at a side of the first side of the first corner with respect to the reference plane.

DETAILED DESCRIPTION

Figure 1:
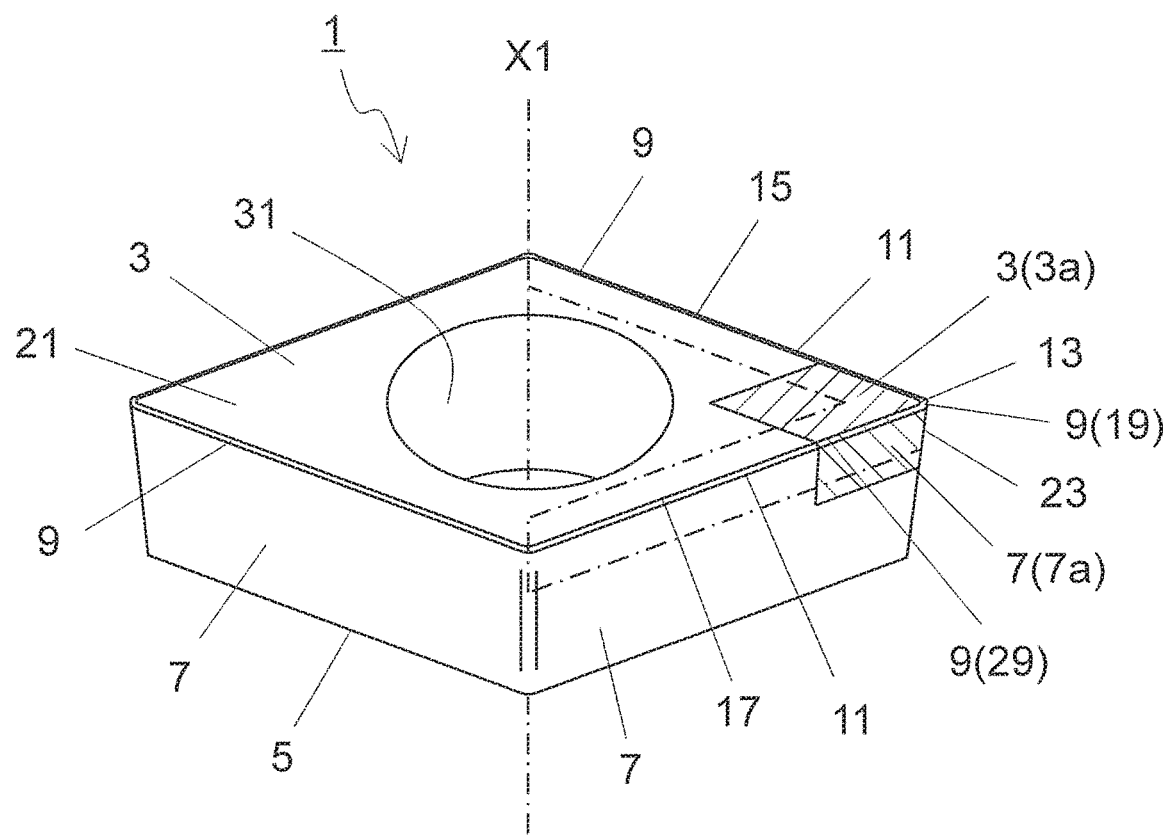
FIG. 1 is a perspective view illustrating a cutting insert in a non-limiting embodiment.

Cutting inserts (hereinafter also referred to simply as "the inserts") in non-limiting embodiments may be described in detail below with reference to the drawings. For convenience of description, the drawings referred to in the following illustrate, in simplified form, only main members necessary for describing non-limiting embodiments. The inserts may be therefore capable of including any arbitrary component not illustrated in the drawings referred to. Dimensions of the members in each of the drawings may be ones which faithfully represent neither dimensions of actual structural members nor dimension ratios of these members.

<Cutting Inserts>

The insert 1 in a non-limiting embodiment may have a polygonal plate shape and may include a first surface 3 (an upper surface in FIG. 1), a second surface 5 (a lower surface in FIG. 1), a third surface 7 (a side surface in FIG. 1), and a land surface 9.

The first surface 3 may have a polygonal shape as illustrated in FIG. 1. The second surface 5 may be located on opposite side of the first surface 3 as illustrated in FIG. 1. The third surface 7 may be located between the first surface 3 and the second surface 5 as illustrated in FIG. 1. The land surface 9 may be located between the first surface 3 and the third surface 7, and may be inclined relative to the first surface 3 and the third surface 7 as illustrated in FIG. 1.

The insert 1 may include a cutting edge 11 located on at least a part of a ridge line where the land surface 9 intersects with the third surface 7 in a non-limiting embodiments. The cutting edge 11 may include a first cutting edge 11a, a second cutting edge 11b, a third cutting edge 11c and a fourth cutting edges 11 as described later.

Figure 2:
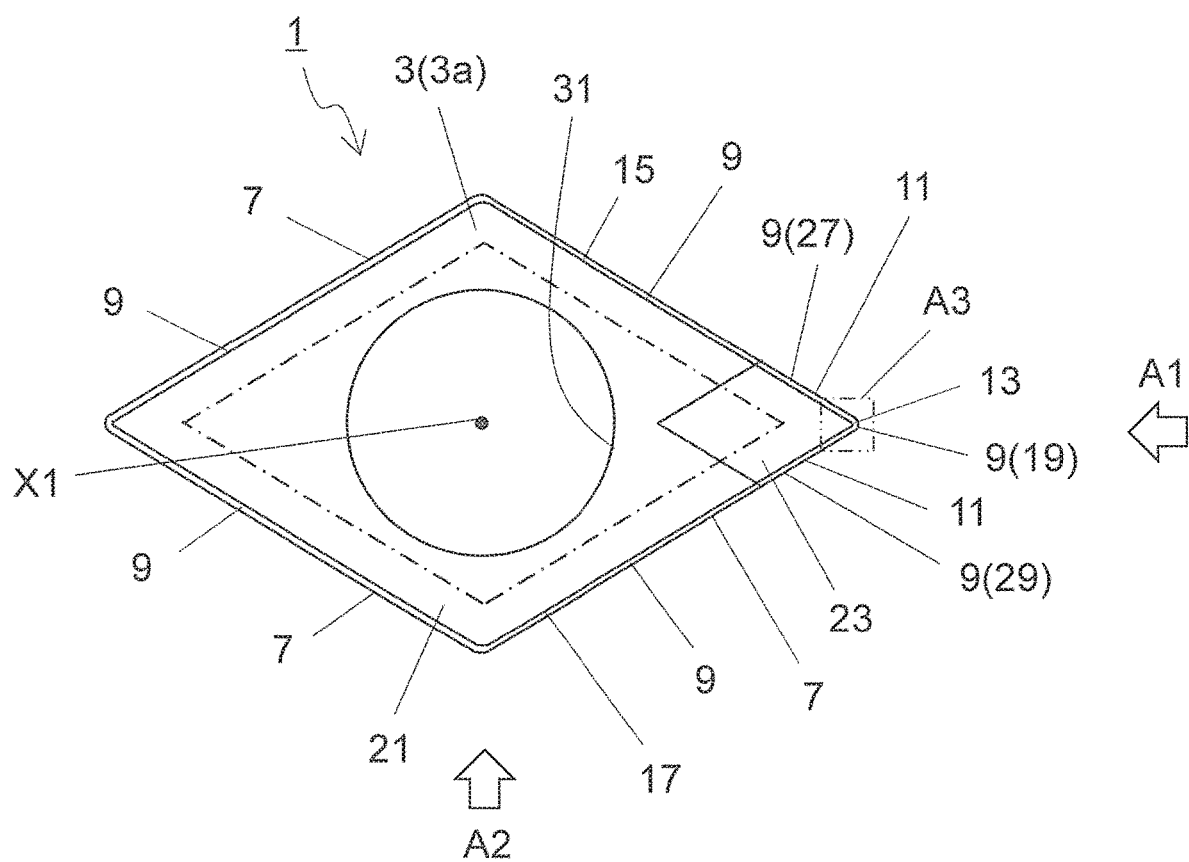
FIG. 2 is a plan view of the cutting insert illustrated in FIG. 1 as viewed from a side of a first surface.

An outer peripheral edge of the first surface 3 in the non-limiting embodiment illustrated in FIG. 1 may have a polygonal shape, and may have a rhomboidal shape in FIG. 2. Accordingly, the first surface 3 may include four corners and four sides. In this case, one of the four corners may be referred to as a first corner 13, and two sides extending from the first corner 13 may be respectively referred to as a first side 15 and a second side 17.

The term "polygonal shape" is not limited to a strict polygonal shape. For example, if the first surface 3 is viewed from the front, in other words, in a plan view of the first surface 3, the four corners of the first surface 3 may be rounded, and may have a slightly outwardly protruded shape.

The four sides need not have a strict straight line shape in the plan view of the first surface 3. These sides may have an outwardly slightly protruded or slightly recessed shape in the plan view of the first surface 3.

The second surface 5 may have a polygonal shape. Similar to the first surface 3, the second surface 5 may have a rhomboidal shape in a non-limiting embodiment. Accordingly, the third surface 7 may include four flat surfaces that are approximately flat, and four curved surfaces that connect these flat surfaces in the non-limiting embodiment illustrated in FIG. 1.

Shapes of the first surface 3 and the second surface 5 are not limited to the above configurations. The shapes of the first surface 3 and the second surface 5 may be quadrangular shapes in the insert 1 of a non-limiting embodiment. Alternatively, the shapes of the first surface 3 and the second surface 5 may be, for example, triangular shapes or hexagonal shapes.

An imaginary flat surface orthogonal to a central axis X1 connecting a center of the first surface 3 and a center of the second surface 5 may be referred to as a reference plane X2. The second surface 5 may be a flat surface parallel to the reference plane X2 in a non-limiting embodiments.

Dimensions of the insert 1 are not particularly limited. For example, a length of one side of the first surface 3 may be set to approximately 3-20 mm. A height from the first surface 3 to the second surface 5 may be set to approximately 5-20 mm.

The land surface 9 may be a narrow-width band shaped region located along the cutting edge 11. The land surface 9 may connect to the cutting edge 11. A width of the land surface 9 indicated by intervals of the cutting edge 11 and the first surface 3 may be set to, for example, approximately 0.01-0.5 mm in the plan view of the first surface 3. The cutting edge 11 may have high durability because the insert 1 may include the land surface 9.

The land surface 9 may be located along the entirety of an outer periphery of the first surface 3 or, alternatively may be located on only a part of the outer periphery of the first surface 3. Specifically, the land surface 9 may be located along only a single side on the quadrangular shaped first surface 3 or, alternatively, along only part of the side.

The land surface 9 may be inclined relative to the second surface 5 so as to approach the second surface 5 as going from a side that connects to the first surface 3 toward a side that connects to the third surface 7 in a non-limiting embodiment. That is, the land surface 9 may be a so-called negative land in a non-limiting embodiment.

The first surface 3 may at least partially include a rake surface region 3a. The region along the land surface 9 on the first surface 3 may be the rake surface region 3a in a non-limiting embodiment. The rake surface region 3a may connect to the land surface 9.

The third surface 7 may at least partially include a flank surface region 7a. A region along the land surface 9 on the third surface 7 may be the flank surface region 7a in a non-limiting embodiment. The flank surface region 7a may connect to the land surface 9. A boundary between the rake surface region 3a and other region on the first surface 3, and a boundary between the flank surface region 7a and other region on the third surface 7 may be individually indicated by a chain line in the non-limiting embodiment illustrated in FIG. 1.

The land surface 9 may include a first land surface 19 in a non-limiting embodiment. The first land surface 19 may be located along the first corner 13 on the first surface 3, and may connect to the first corner 13. An inclination angle $\theta$ of the first land surface 19 relative to the reference plane X2 may be not constant but may have a different value depending on the location of the first land surface 19.

In cases where the first surface 3 includes the first corner 13, the first land surface 19 located on the first corner 13 is susceptible to a large load. An inclination angle $\theta$ of the first land surface 19 may be increased to enhance durability of the first land surface 19. However, a mere increase in the angle $\theta$ of the first land surface 19 may degrade cutting performance of the cutting edge 11 that connects to the first land surface 19, and may degrade machinability.

A first inclination angle $\theta 1$ that is an inclination angle of a part of the first land surface 19 which connects to a center of the first corner 13 (hereinafter referred to as a midportion 19a for the sake of convenience) relative to the reference plane X2 may be larger than a second inclination angle $\theta 2$ that is an inclination angle of a part of the first land surface 19 which connects to an end portion on a side of the first side 15 of the first corner 13 (hereinafter referred to as a first end portion 19b for the sake of convenience) relative to the reference plane X2 in the non-limiting embodiment illustrated in FIGS. 5 to 8.

The midportion 19a of the first land surface 19 is susceptible to a large cutting load. However, the first land surface 19 may have enhanced durability because the first inclination angle $\theta 1$ of the first land surface 19 at the midportion 19a is relatively large.

Good cutting performance at the first end portion 19b may be ensured because the second inclination angle $\theta 2$ at the first end portion 19b of the first land surface 19 is relatively small. With the insert 1 in a non-limiting embodiments, the first land surface 19 may have enhanced durability and good cutting performance if a ridge line where the third surface 7 intersects with a part of the first land surface 19 which is extended from the midportion 19a to the first end portion 19b is used as the first cutting edge 11a.

The first inclination angle $\theta 1$ at the midportion 19a of the first land surface 19 is settable to, for example, 25-55°. The second inclination angle $\theta 2$ of the first land surface 19 at the first end portion 19b is settable to, for example, 5-30°. These numerical values may be examples, and the first inclination angle $\theta 1$ and the second inclination angle $\theta 2$ are therefore not limited to the above values.

For example, cemented carbide, cermet, ceramics, PCD (polycrystal diamond) and cBN (cubic boron nitride) are usable as a material of the insert 1.

Examples of composition of the cemented carbide may include WC(tungsten carbide)-Co, WC-TiC(titanium carbide)-Co and WC-TiC-TaC(tantalum carbide)-Co. WC, TiC and TaC may be hard particles, and Co may be a binding phase. The cermet may be a sintered composite material obtainable by compositing metal into a ceramic component. Examples of the cermet may include compounds composed mainly of TiC or TiN (titanium nitride). However, it is not intended to limit the material of the insert 1 to these materials.

The insert 1 may include only one member composed of the above illustrated material or, alternatively, may include a plurality of members composed of the above illustrated material.

For example, the insert 1 may include a main body 21 and a cutting part 23, and may have the polygonal plate shape as a whole as illustrated in FIG. 1. The main body 21 may have an approximately polygonal plate shape, part of which is cut away into a concave shape in the non-limiting embodiment illustrated in FIG. 1. The cutting part 23 may be joined to the concave shaped part thus cut away, by using a brazing material or the like.

As in the non-limiting embodiment illustrated in FIG. 1, the first corner 13, the first side 15 and the second side 17 may be located on the cutting part 23. The cutting part 23 may be marked with slant lines in FIG. 1 in order to facilitate visual understanding.

The cutting part 23 may be composed of a material having relatively high hardness, such as PCD and cBN, and the main body 21 may be composed of, for example, cemented carbide, cermet or ceramics. If the main body 21 and the cutting part 23 are individually composed of the above materials, the insert 1 is manufacturable inexpensively. The insert 1 also may have enhanced durability against cutting load. The hardness of the main body 21 and the cutting part 23 may be evaluated by measuring their respective Vickers hardness.

Although the insert 1 may include only the cutting part 23 and the main body 21, the insert 1 may include, in addition to the cutting part 23 and the main body 21, a coating layer that covers their respective surfaces. The coating layer may entirely or partially cover a surface of a base member composed of the cutting part 23 and the main body 21.

Examples of material of the coating layer may include aluminum oxide (alumina), and carbides, nitrides, oxides, oxocarbon, nitrogen oxides, carbonitrides or carboxynitrides of titanium. The coating layer may include only one or a plurality of the above materials.

The coating layer may be composed of only a single layer or a plurality of layers laminated one upon another. The material of the coating layer is not limited to the above materials. The coating layer can be located on the base member by using chemical vapor deposition (CVD) method or physical vapor deposition (PVD) method.

The inclination angle $\theta$ of the first land surface 19 may not be constant. The first inclination angle $\theta 1$ may be larger than the second inclination angle $\theta 2$ in a non-limiting embodiment. If the inclination angle $\theta$ of the first land surface 19 increases as approaching the midportion 19$a$ from the first end portion 19$b$, the first land surface 19 may have further enhanced durability and higher cutting performance.

Specifically, the first land surface 19 may have further enhanced durability because the inclination angle $\theta$ is increased to some extent at the part of the first land surface 19 which is susceptible to a large cutting load. The first land surface 19 may have better cutting performance because the inclination angle $\theta$ decreases as going away from the part of the first land surface 19 which is susceptible to the large cutting load.

The inclination angle $\theta$ of the first land surface 19 may increase as approaching the midportion 19$a$ from a part of the first corner 13 which connects to an end portion at a side of the second side 17 (hereinafter referred to as a second end portion 19$c$ for the sake of convenience) as in the non-limiting embodiment illustrated in FIGS. 5 to 8. In this case, the first land surface 19 may have enhanced durability and good cutting performance also if a ridge line where the third surface 7 intersects with a part of the first land surface 19 which is extended from the midportion 19$a$ to the second end portion 19$c$ is used as the second cutting edge 11$b$. That is, it is possible to use for both so-called right-handed cutting tool and left-handed cutting tool. The insert 1 may be therefore excellent in economical efficiency.

The inclination angle $\theta$ of the first land surface 19 may decrease as approaching each of the first end portion 19$b$ and the second end portion 19$c$ from the midportion 19$a$ as in the non-limiting embodiment illustrated in FIGS. 5 to 10. That is, the inclination angle $\theta$ of the first land surface 19 may become largest at the midportion 19$a$.

The inclination angle $\theta$ of the first land surface 19 is not limited to the above configuration, but may have, for example, a configuration illustrated in FIGS. 13 to 17. The first corner 13 may include a first portion 25 located between the center of the first corner 13 and an end portion at a side of the second side 17 in the non-limiting embodiment illustrated in FIGS. 13 to 17. The inclination angle $\theta$ of the first land surface 19 may become maximum at a part that connects to the first portion 25.

The first land surface 19 may have enhanced durability and good cutting performance if the second cutting edge 11$b$ located on a ridge line where the third surface 7 intersects with a part located closer to a side of the second side 17 than the midportion 19$a$ is used as the cutting edge 11 in addition to the first cutting edge 11$a$. In particular, if the second cutting edge 11$b$ serves as a main cutting edge, and the first cutting edge 11$a$ serves as a flat cutting edge, the main cutting edge subjected to a relatively large cutting load may have enhanced durability.

Figure 5:
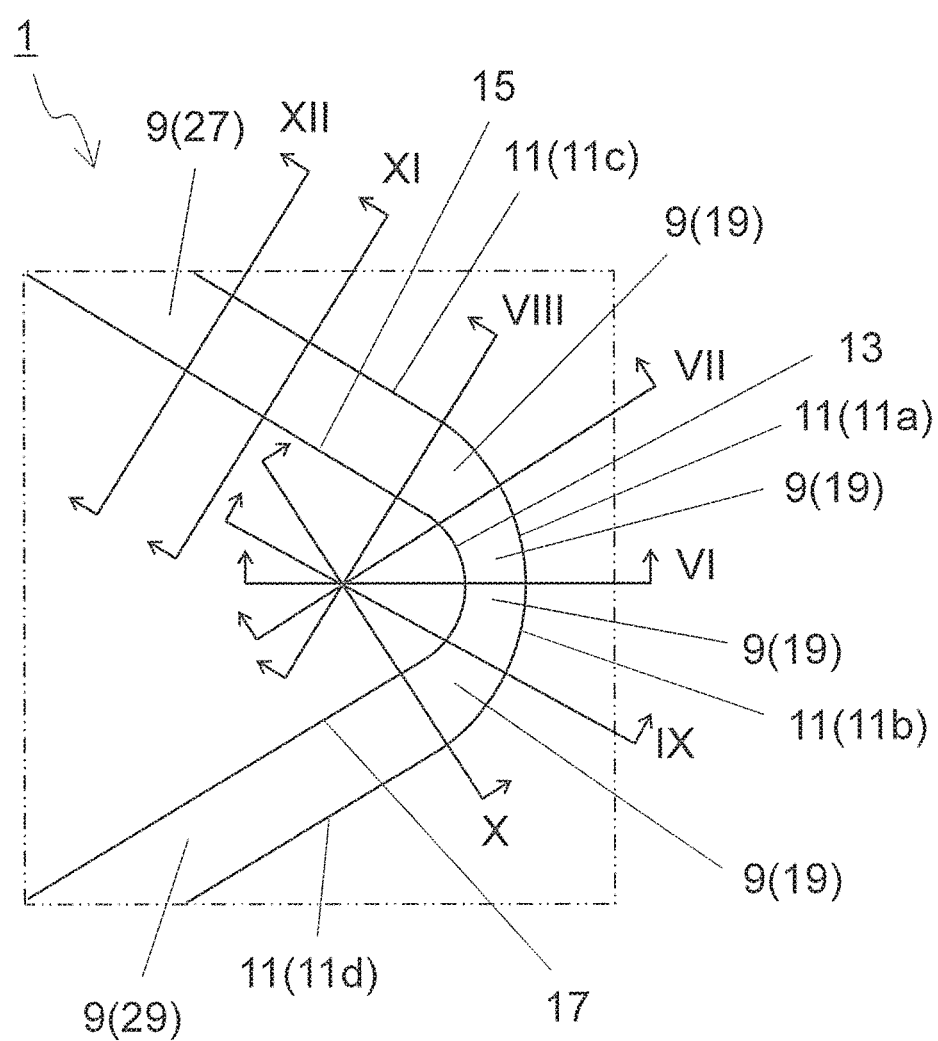
FIG. 5 is an enlarged view of a region A3 illustrated in FIG. 2.
Figure 6:
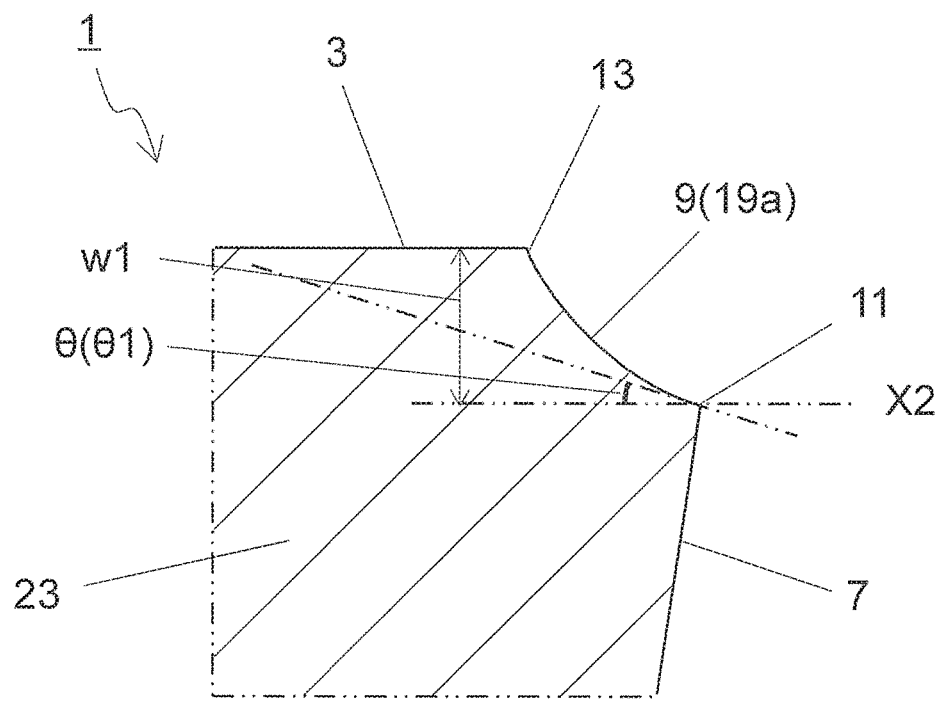
FIG. 6 is a cross-sectional view taken along line VI-VI in the cutting insert illustrated in FIG. 5.
Figure 7:
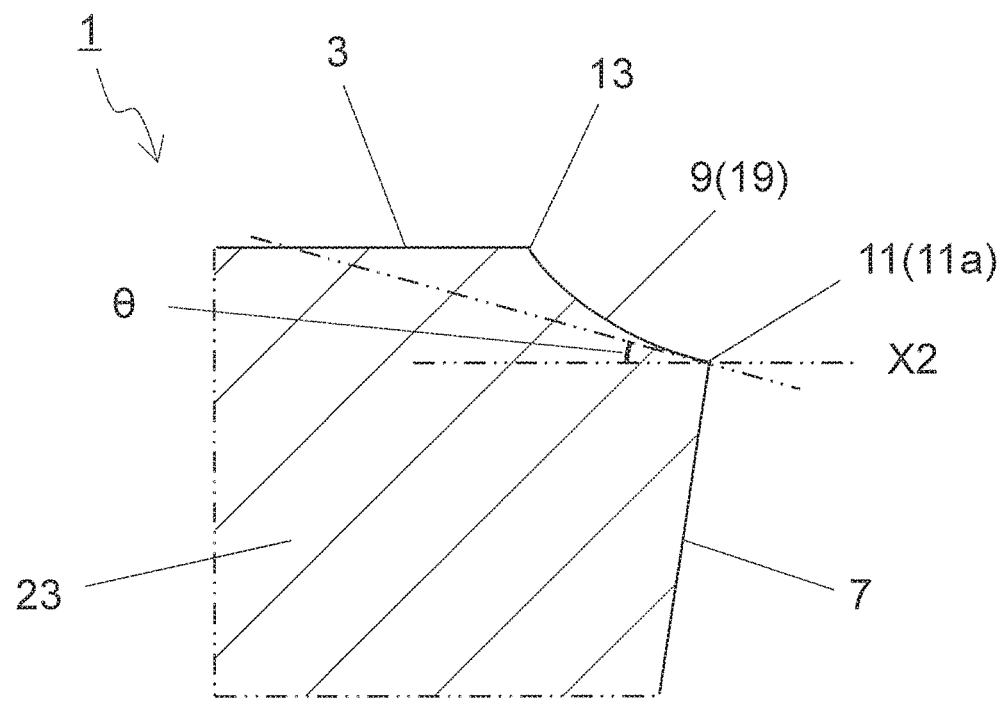
FIG. 7 is a cross-sectional view taken along line VII-VII in the cutting insert illustrated in FIG. 5.
Figure 8:
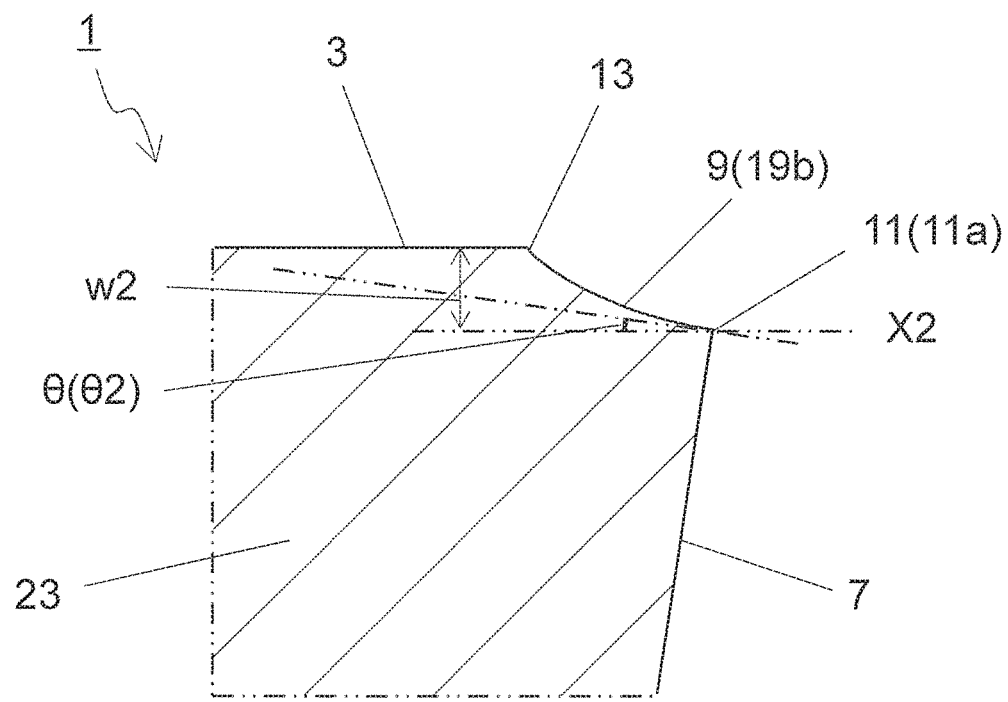
FIG. 8 is a cross-sectional view taken along line VIII-VIII in the cutting insert illustrated in FIG. 5.
Figure 9:
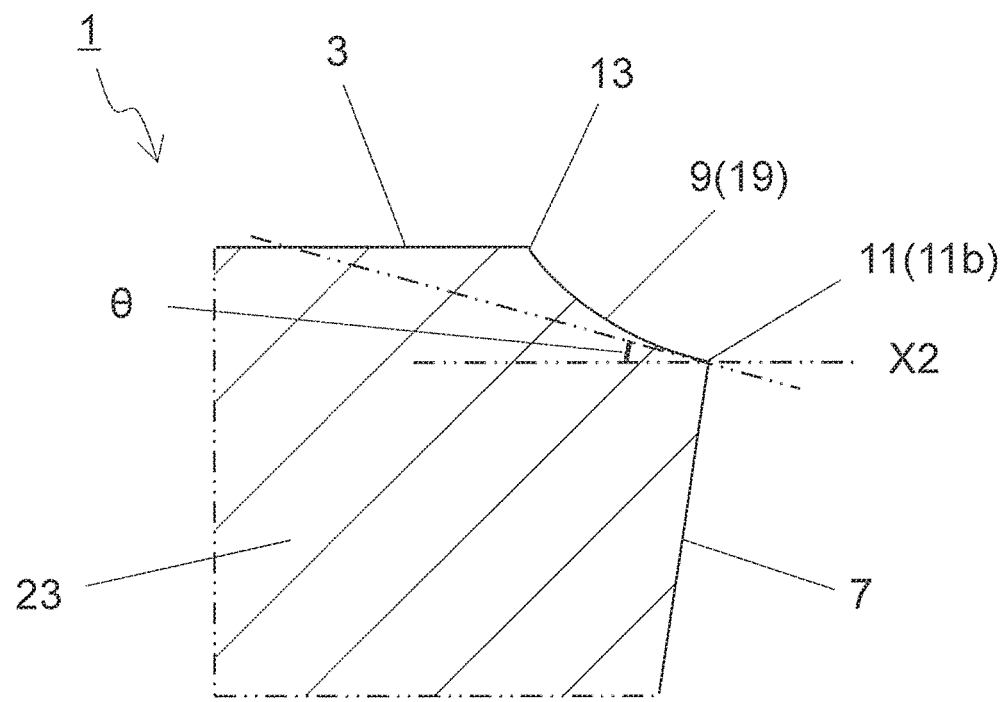
FIG. 9 is a cross-sectional view taken along line IX-IX in the cutting insert illustrated in FIG. 5.
Figure 10:
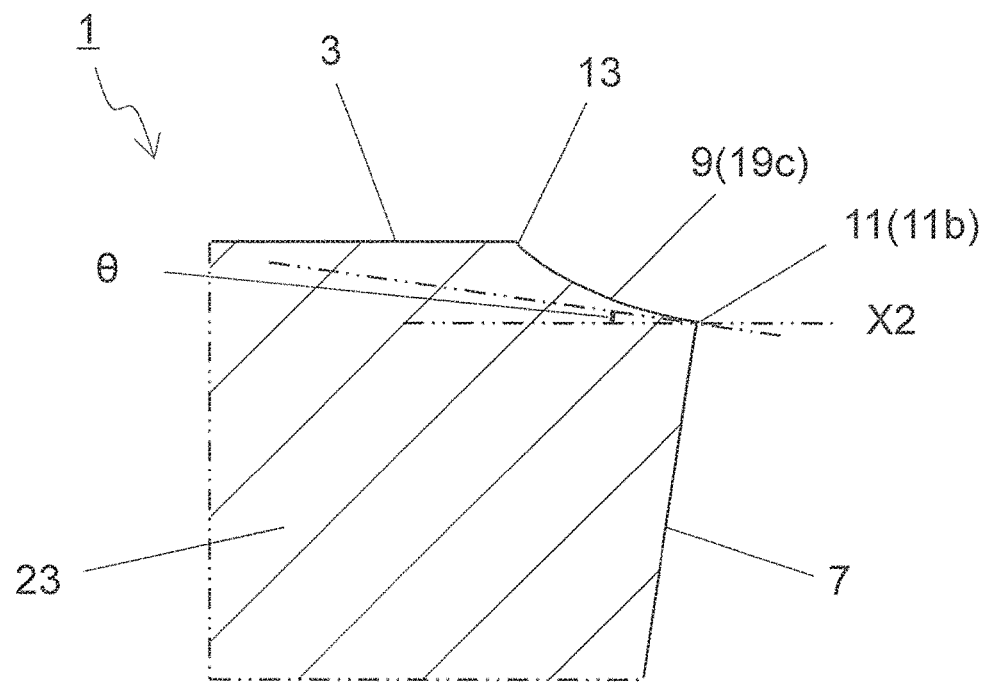
FIG. 10 is a cross-sectional view taken along line X-X in the cutting insert illustrated in FIG. 5.
Figure 11:
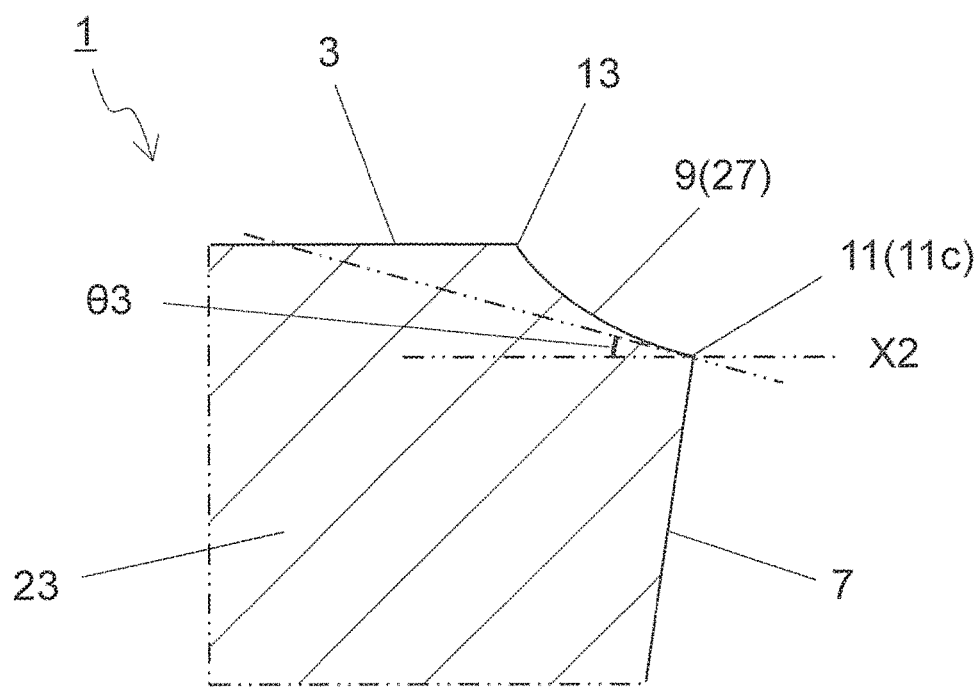
FIG. 11 is a cross-sectional view taken along line XI-XI in the cutting insert illustrated in FIG. 5.
Figure 12:
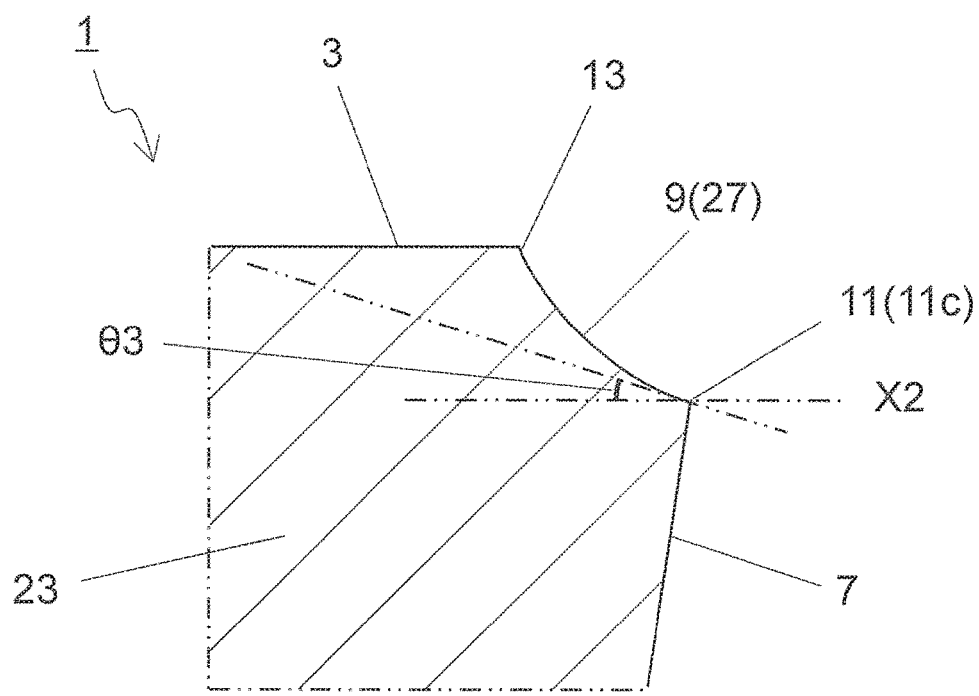
FIG. 12 is a cross-sectional view taken along line XII-XII in the cutting insert illustrated in FIG. 5.
Figure 13:
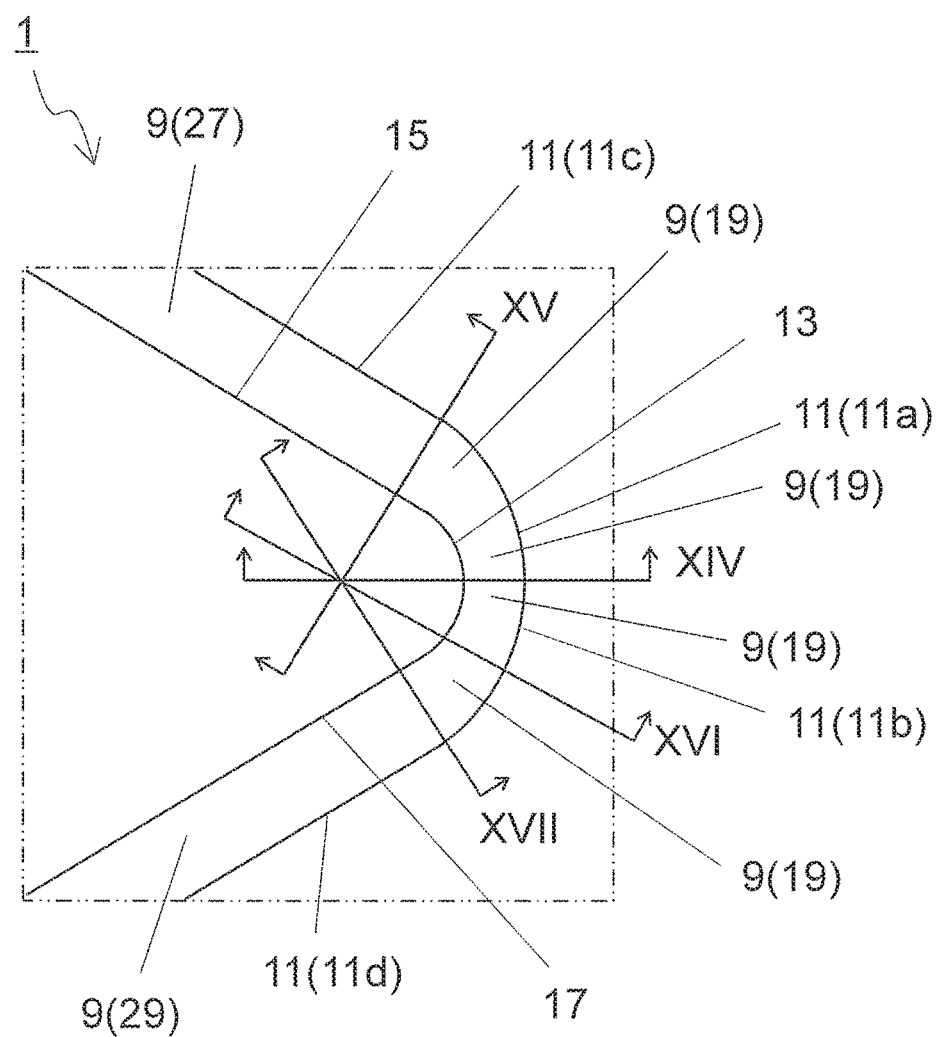
FIG. 13 is an enlarged view of another non-limiting embodiment of the cutting insert illustrated in FIG. 5.
Figure 14:
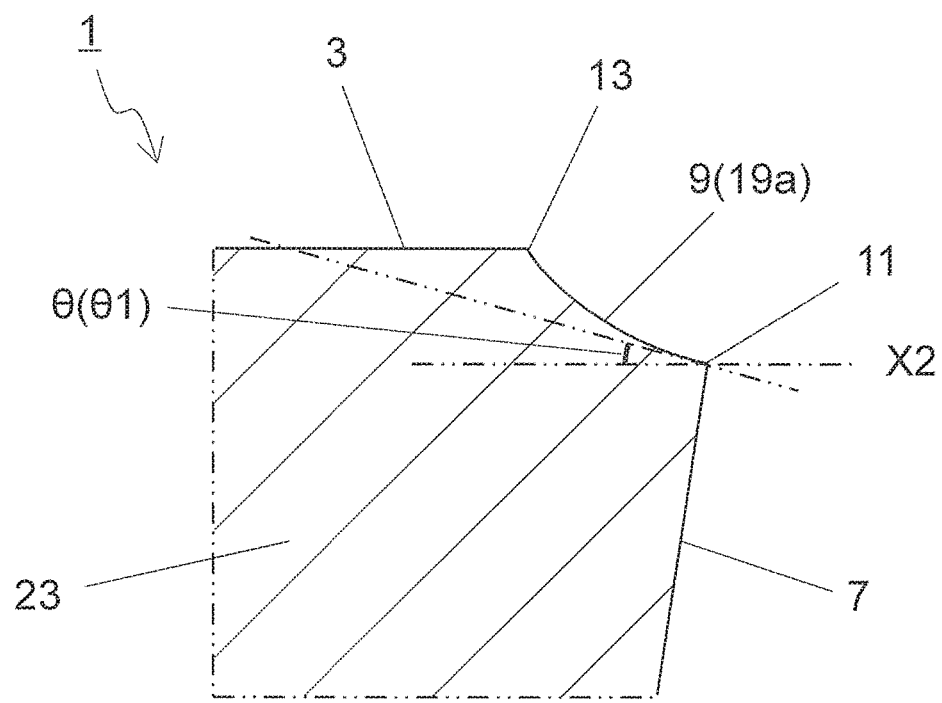
FIG. 14 is a cross-sectional view taken along line XIV-XIV in the cutting insert illustrated in FIG. 13.
Figure 15:
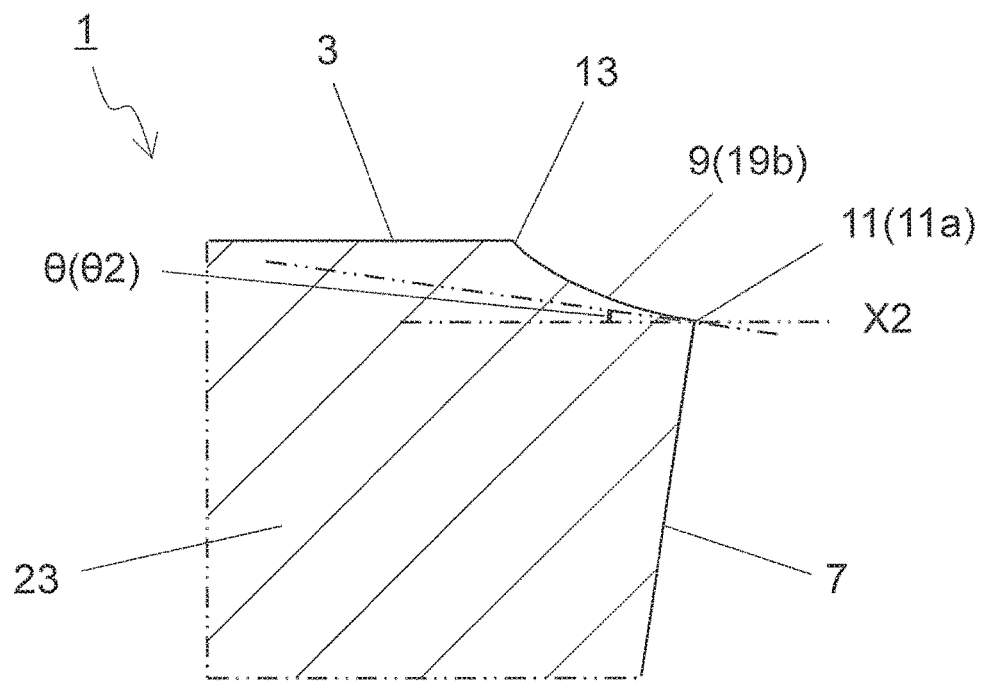
FIG. 15 is a cross-sectional view taken along line XV-XV in the cutting insert illustrated in FIG. 13.
Figure 16:
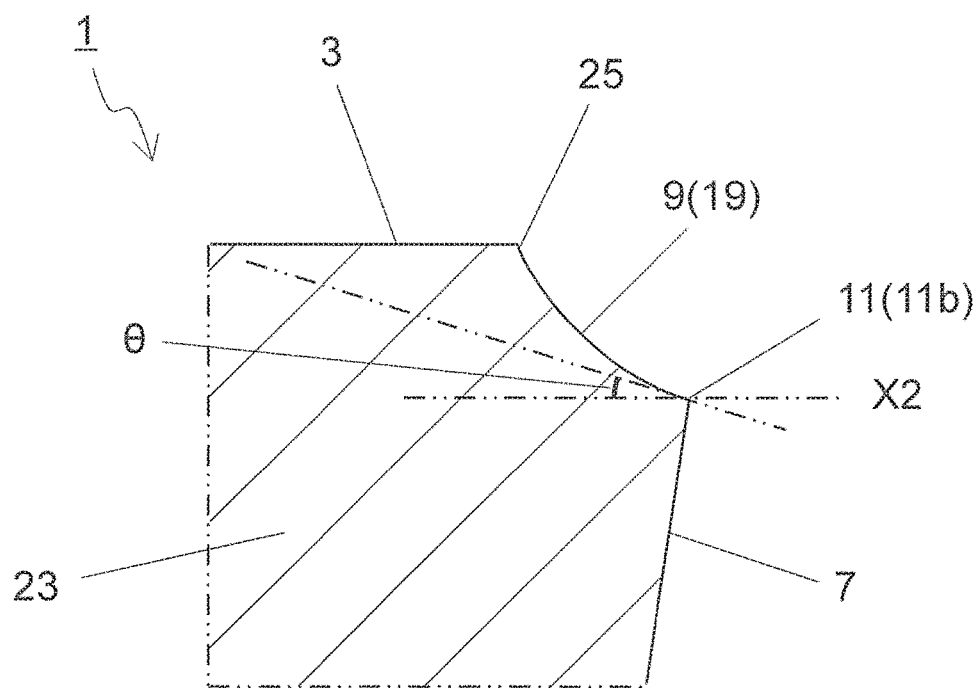
FIG. 16 is a cross-sectional view taken along line XVI-XVI in the cutting insert illustrated in FIG. 13.
Figure 17:
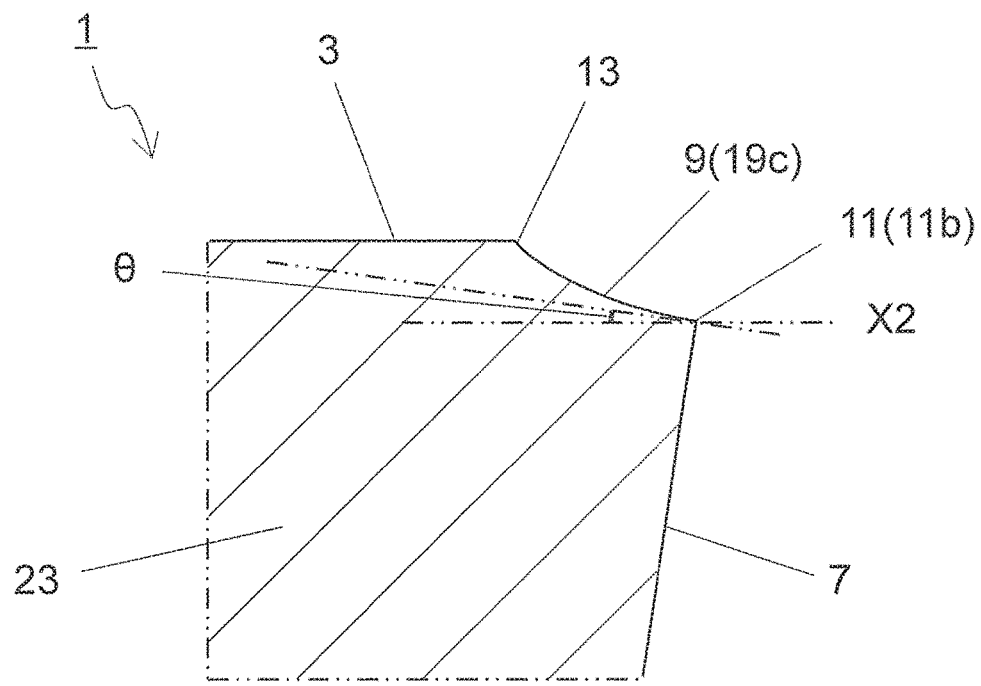
FIG. 17 is a cross-sectional view taken along line XVII-XVII in the cutting insert illustrated in FIG. 13.

The land surface 9 may include a second land surface 27 and a third land surface 29 in the non-limiting embodiment illustrated in FIG. 5. The second land surface 27 may be located along the first side 15 on the first surface 3. The second land surface 27 may connect to the first side 15. The third land surface 29 may be located along the second side 17 on the first surface 3. The third land surface 29 may connect to the second side 17. In this case, an inclination angle of the second land surface 27 relative to the reference plane X2 may be referred to as a third inclination angle $\theta 3$ as illustrated in FIGS. 11 and 12.

In cases where at least a part of a ridge line where the second land surface 27 intersects with the third surface 7 is used as the third cutting edge 11$c$, the third inclination angle $\theta 3$ may be kept constant. However, if the third inclination angle $\theta 3$ increases as going away from the first corner 13, the insert 1 may have further enhanced durability. In particular, if the third cutting edge 11$c$ is used as a main cutting edge, the main cutting edge subjected to a relatively large cutting load may have enhanced durability.

The third cutting edge 11$c$ may be located farther away from a finished surface of a workpiece during a cutting process as going away from the first corner 13. Therefore, the third cutting edge 11$c$ may be configured for durability rather than cutting performance as going away from the first corner 13. The third inclination angle $\theta 3$ may increase as going away from the first corner 13 in the non-limiting embodiment illustrated in FIGS. 11 and 12. The enhanced durability of the insert 1 can therefore be ensured while improving surface quality of a finished surface of a workpiece.

In the cases where at least the part of the ridge line where the second land surface 27 intersects with the third surface 7 is used as the third cutting edge 11c, the third inclination angle θ3 may decrease as going away from the first corner 13. This may lead to higher surface accuracy of the finished surface of the workpiece. In particular, if the third cutting edge 11c is used as a flat cutting edge, the surface accuracy of the finished surface of the workpiece can be further enhanced.

Figure 3:
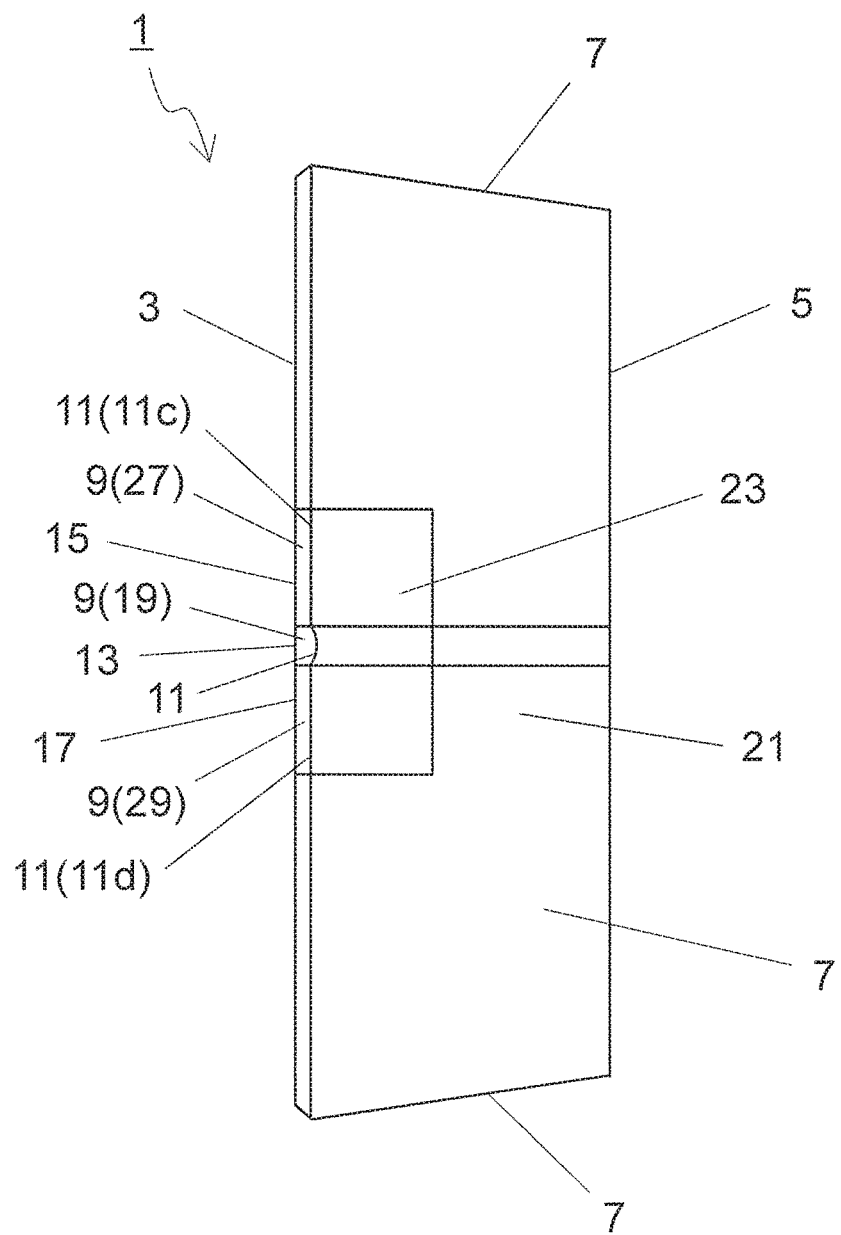
FIG. 3 is a side view of the cutting insert illustrated in FIG. 2 as viewed from direction A1.
Figure 4:
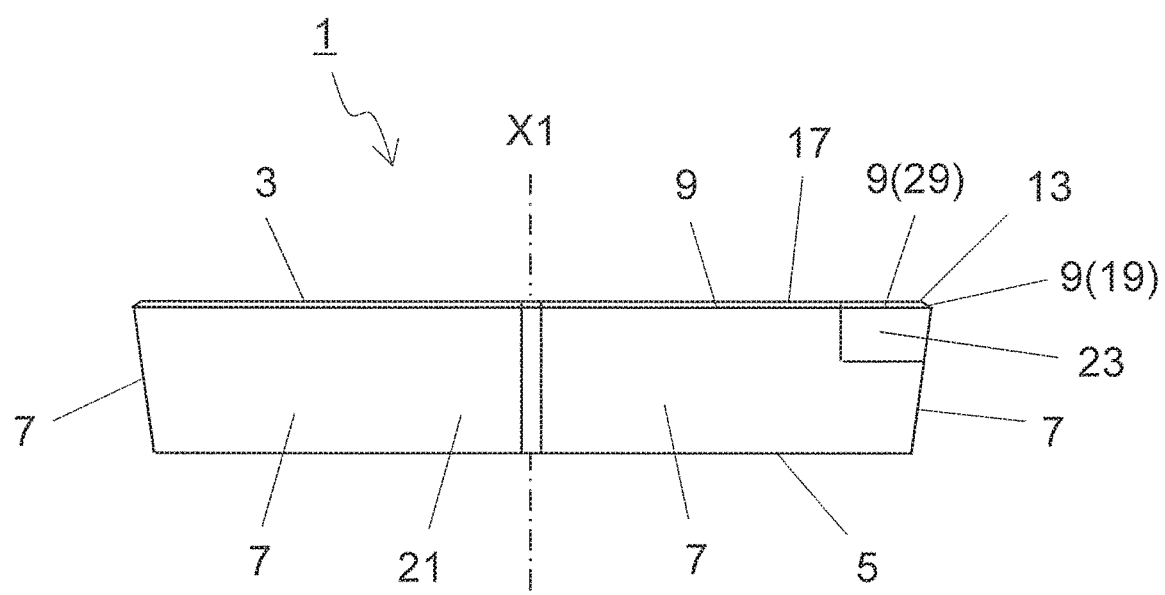
FIG. 4 is a side view of the cutting insert illustrated in FIG. 2 as viewed from direction A2.

The land surface 9 may be the narrow-width band shaped region located along the cutting edge 11. The width of the land surface 9 may be kept constant or, alternatively, may be different depending on the location. A width of the midportion 19a may be larger than a width of the first end portion 19b in the plan view of the third surface 7 in the non-limiting embodiment illustrated in FIG. 3. If the first land surface 19 has the above configuration, the durability of the first land surface 19 can be further enhanced, and higher cutting performance is obtainable. The reason for this may be as follows. That is, the first land surface 19 may have further enhanced durability because the width W1 of the midportion 19a is relatively large, and the first land surface 19 may have higher cutting performance because the width W2 of the first end portion 19b is relatively small.

A shape of the first land surface 19 in a cross section orthogonal to the first corner 13 is not limited to a predetermined shape. The shape of the first land surface 19 in the cross section may be, for example, a straight line shape or, alternatively, may have a concave shape as in the non-limiting embodiment illustrated in FIGS. 6 to 10. If the first land surface 19 has the concave shape as illustrated in FIGS. 6 to 10, the first land surface 19 may have a small width in the plan view of the first surface 3 even under the condition that the first inclination angle θ3 remains unchanged. Consequently, the cutting edge 11 may have higher cutting performance.

In cases where the shape of the first land surface 19 is not the straight line shape in the cross section as in the non-limiting embodiment illustrated in FIGS. 6 to 10, the inclination angle θ of the first land surface can be indicated by an inclination angle relative to the reference plane X2 at a lower end of the first land surface 19.

The insert 1 may include a through hole 31 as illustrated in FIG. 1. The through hole 31 may be extended from the first surface 3 to the second surface 5 and may open into these surfaces in a non-limiting embodiments. The through hole 31 may be used for attaching a fixing screw or clamping member when fixing the insert 1 to the holder. There may be no problem if the through hole 31 is configured to open into regions of the third surface 7 which are located opposite sides.

<Cutting Tool>

A cutting tool 101 in a non-limiting embodiment may be described below with reference to the drawings.

Figure 18:
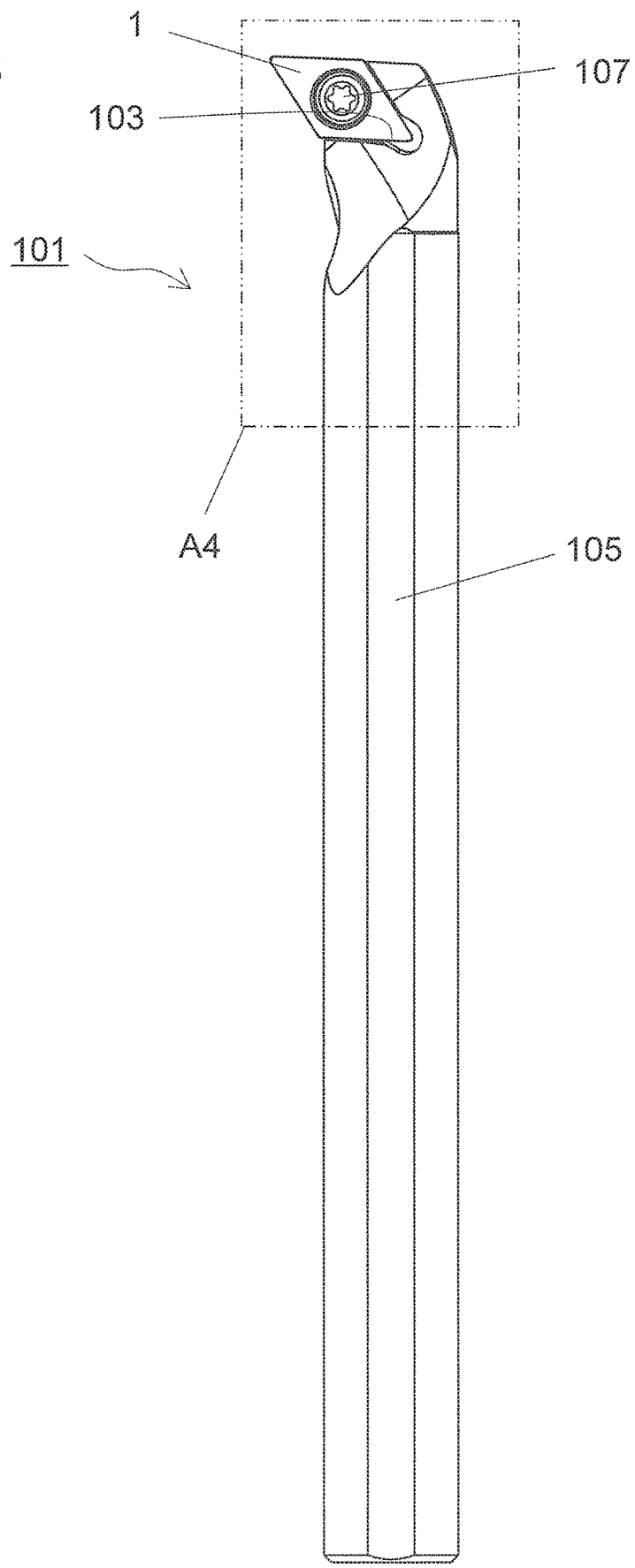
FIG. 18 is a perspective view illustrating a cutting tool in a non-limiting embodiment.
Figure 19:
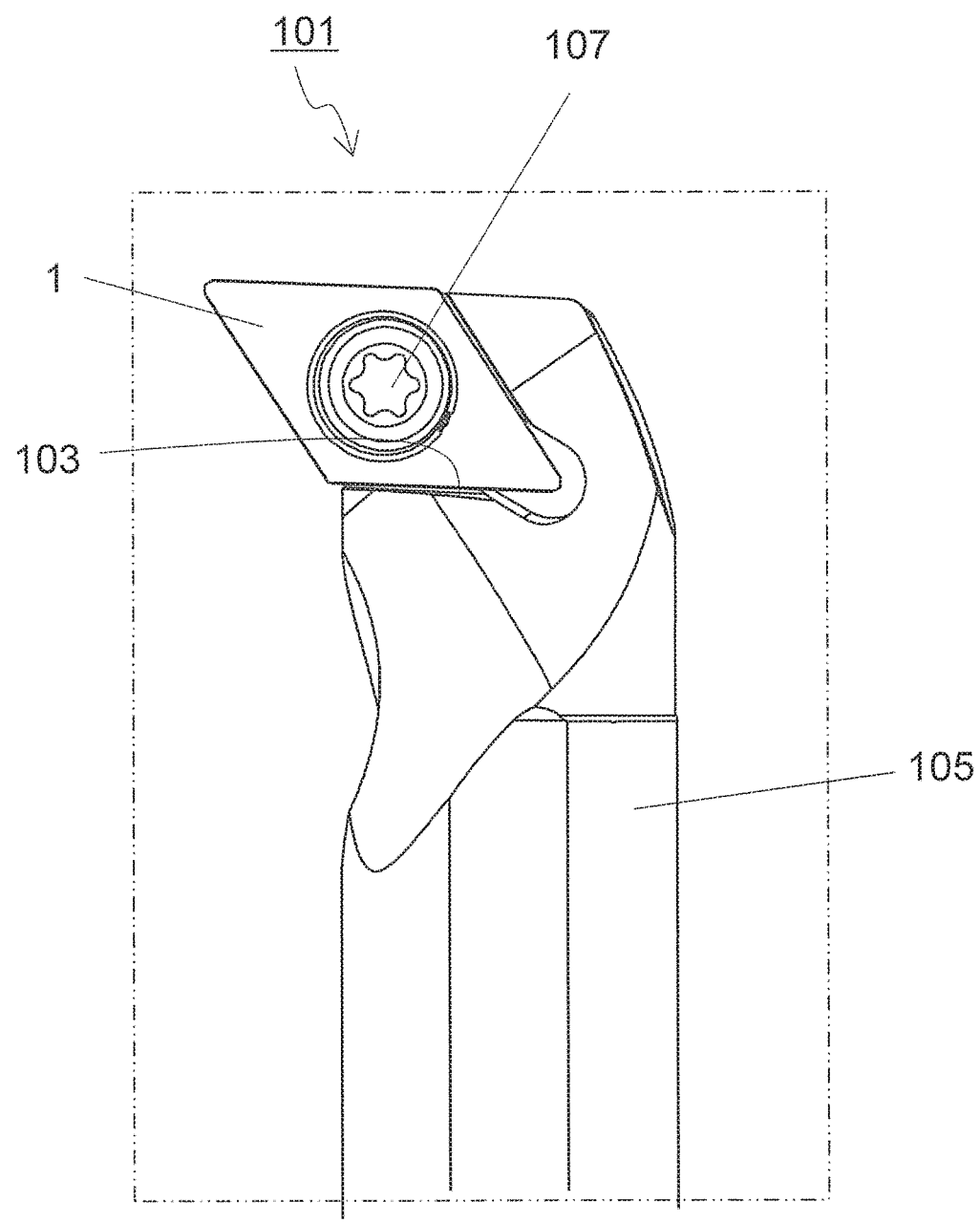
FIG. 19 is an enlarged view of a region A4 illustrated in FIG. 18.

As illustrated in FIG. 18, the cutting tool 101 may include a holder 105 with a pocket 103 (insert pocket) at a side of a front end thereof, and the above insert 1 located in the pocket 103 in the non-limiting embodiment. The insert 1 may be attached so that a ridge line may be protruded from the front end of the holder 105 in the cutting tool 101 of a non-limiting embodiment.

The holder 105 may have a bar shape extending narrow and long. The single pocket 103 may be disposed in the side of the front end of the holder 105. The pocket 103 may be a part that permits attachment of the insert 1 and opens into a front end surface of the holder 105. The attachment of the insert 1 can be facilitated by such a configuration that the pocket 103 also opens into a side surface of the holder 105. Specifically, the pocket 103 may include a seating surface parallel to a lower surface of the holder 105, and a constraining side surface inclined relative to the seating surface.

The insert 1 may be located in the pocket 103. The lower surface of the insert 1 may be directly contacted with the pocket 103 or, alternatively, a sheet may be held between the insert 1 and the pocket 103.

The insert 1 may be attached so that a part of the ridge line which is usable as the cutting edge may be protruded outward. The insert 1 may be attached to the holder 105 by a fixing screw 107 in a non-limiting embodiment. That is, the insert 1 is attachable to the holder 105 by engagement between screw parts, specifically, by inserting the fixing screw 107 into the through hole of the insert 1, and by inserting a front end of the fixing screw 107 into a screw hole formed in the insert pocket 103.

Steel or cast iron is usable for the holder 105. Of these materials, the steel may be particularly used from the viewpoint of enhancing toughness of the holder 105.

The non-limiting embodiment illustrates the cutting tool for use in a so-called turning process. Examples of the turning process may include inner diameter machining, outer diameter machining and grooving process. The cutting tool is not intended for use only in the turning process. The insert 1 in the above non-limiting embodiment may be used for a cutting tool usable in a milling process.

<Method for Manufacturing Machined Product>

A method for manufacturing a machined product in a non-limiting embodiment may be described below with reference to the drawings.

The machined product is manufacturable by carrying out a cutting process of a workpiece 201. The method for manufacturing a machined product in the non-limiting embodiment may include the following steps:

the step (1) of rotating the workpiece 201;

the step (2) of bringing the ridge line in the cutting tool 101 represented by the foregoing non-limiting embodiments into contact with the workpiece 201 being rotated; and the step (3) of moving the cutting tool 101 away from the workpiece 201.

Figure 20:
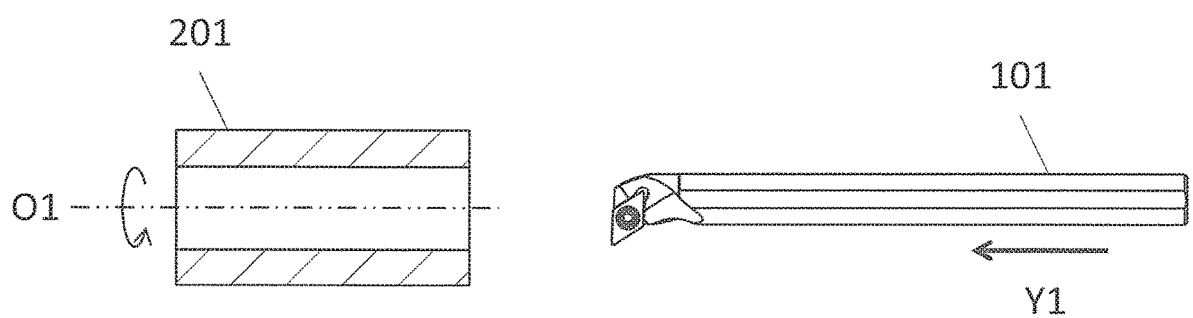
FIG. 20 is a schematic diagram illustrating one of the steps in a method for manufacturing a machined product in a non-limiting embodiment.
Figure 21:
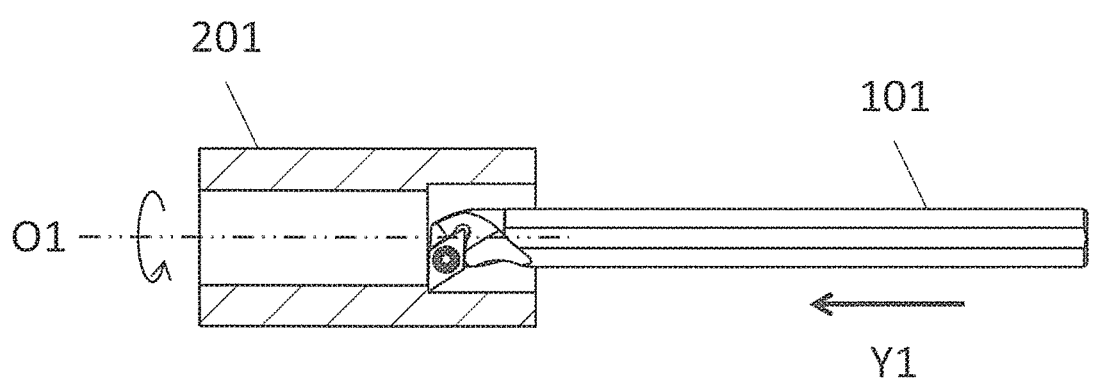
FIG. 21 is a schematic diagram illustrating one of the steps in the method for manufacturing a machined product in a non-limiting embodiment.
Figure 22:
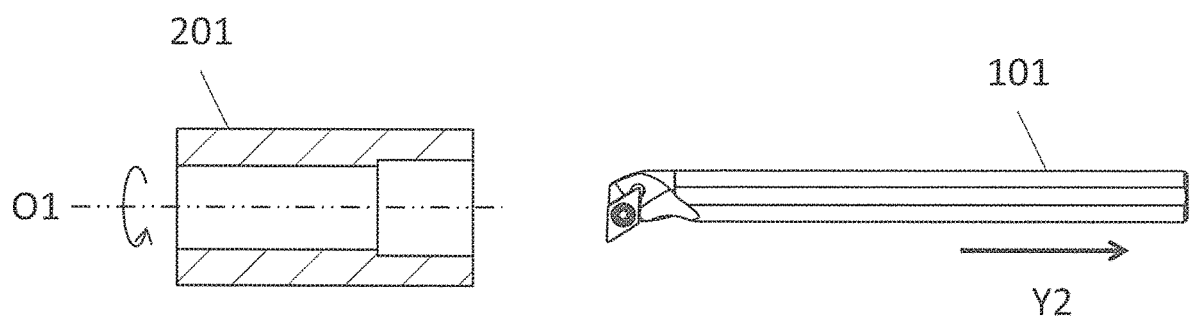
FIG. 22 is a schematic diagram illustrating one of the steps in the method for manufacturing a machined product in a non-limiting embodiment.

More specifically, firstly, the workpiece 201 may be rotated around an axis O1, and the cutting tool 101 may be relatively brought near the workpiece as illustrated in FIG. 20. The workpiece 201 may be then cut out by bringing the ridge line (cutting edge) in the cutting tool 101 into contact with the workpiece 201 as illustrated in FIG. 21. Thereafter, the cutting tool 101 may be relatively moved away from the workpiece 201 as illustrated in FIG. 22.

In a state in which the axis O1 is fixed and the workpiece 201 is rotated, the cutting tool 101 may be brought near the workpiece 201 by moving the cutting tool 101 in Y1 direction in the non-limiting embodiment. In FIG. 21, the workpiece 201 may be cut out by bringing the cutting edge in the cutting insert into contact with the workpiece 201 being rotated. In FIG. 22, the cutting tool 101 may be moved away by moving the cutting tool 101 in Y2 direction in a state in which the workpiece 201 is rotated.

Although the cutting tool 101 may be brought into contact with the workpiece 201, or the cutting tool 101 may be moved away from the workpiece 201 in the individual steps in the cutting process using the manufacturing method in the non-limiting embodiment, it is, of course, not intended to be limited to the above non-limiting embodiment.

For example, the workpiece 201 may be brought near the cutting tool 101 in the step (1). Similarly, the workpiece 201 may be moved away from the cutting tool 101 in the step (3).

If desired to continue the cutting process, the step of bringing the cutting edge in the cutting insert 1 into contact with different portions of the workpiece 201 may be repeated while keeping the workpiece 201 rotated.

Representative examples of material of the workpiece 201 may include carbon steel, alloy steel, stainless steel, cast iron and nonferrous metals.

DESCRIPTION OF THE REFERENCE NUMERALS

1 cutting insert (insert)
3 first surface
5 second surface
7 third surface
9 land surface
11 cutting edge
11*a* first cutting edge
11*b* second cutting edge
11*c* third cutting edge
11*d* fourth cutting edge
13 first corner
15 first side
17 second side
19 first land surface
19*a* midportion
19*b* first end portion
19*c* second end portion
21 main body
23 cutting part
25 first portion
27 second land surface
29 third land surface
31 through hole
101 cutting tool
103 insert pocket (pocket)
105 holder
107 fixing screw
201 workpiece

What is claimed is:

1. A cutting insert, comprising:
a first surface having a polygonal shape;
a second surface located on a side opposite to the first surface;
a third surface located between the first surface and the second surface; and
a land surface located between the first surface and the third surface and inclined relative to the first surface and the third surface, wherein
the first surface comprises:
  a first corner, and
  a first side and a second side, each extended from the first corner;
the land surface comprises a first land surface connecting to the first corner;
the first land surface comprises:
  a first part connected to a midpoint of the first corner, and
  a second part connected to an end portion at a side of the first side of the first corner;
an imaginary flat surface orthogonal to a central axis connecting a center of the first surface and a center of the second surface is a reference plane;
a first inclination angle of the first part with respect to the reference plane is larger than a second inclination angle of the second part with respect to the reference plane;
the first corner comprises a first portion located between the midportion of the first corner and an end portion at the side of the second side,
the first portion is located away from the midportion of the first corner, and
an inclination angle of the first land surface with respect to the reference plane reaches a maximum away from the midportion of the first corner at a part connecting to the first portion.

2. The cutting insert according to claim 1, wherein an inclination angle of the first land surface with respect to the reference plane increases as approaching the first part from the second part.

3. The cutting insert according to claim 1, wherein the land surface further comprises a second land surface connecting to the first side, and
an inclination angle of the second land surface with respect to the reference plane is a third inclination angle, and the third inclination angle increases going away from the first corner.

4. The cutting insert according to claim 1, wherein a width of the first part is larger than a width of the second part in a plan view of the third surface.

5. The cutting insert according to claim 1, wherein the first land surface has a concave shape in a cross section orthogonal to the first corner.

6. A cutting tool, comprising:
a holder comprising a pocket located on a side of a front end of the holder; and
the cutting insert according to claim 1, the insert being located in the pocket.

7. A method for manufacturing a machined product, comprising:
rotating a workpiece;
bringing the cutting tool according to claim 6 into contact with the workpiece being rotated; and
moving the cutting tool away from the workpiece.

\* \* \* \* \*